Sept. 6, 1927.
G. FAST
1,641,668
FLEXIBLE SHAFT COUPLING FOR RELATIVELY ADJUSTABLE SHAFTS
Original Filed March 17, 1925
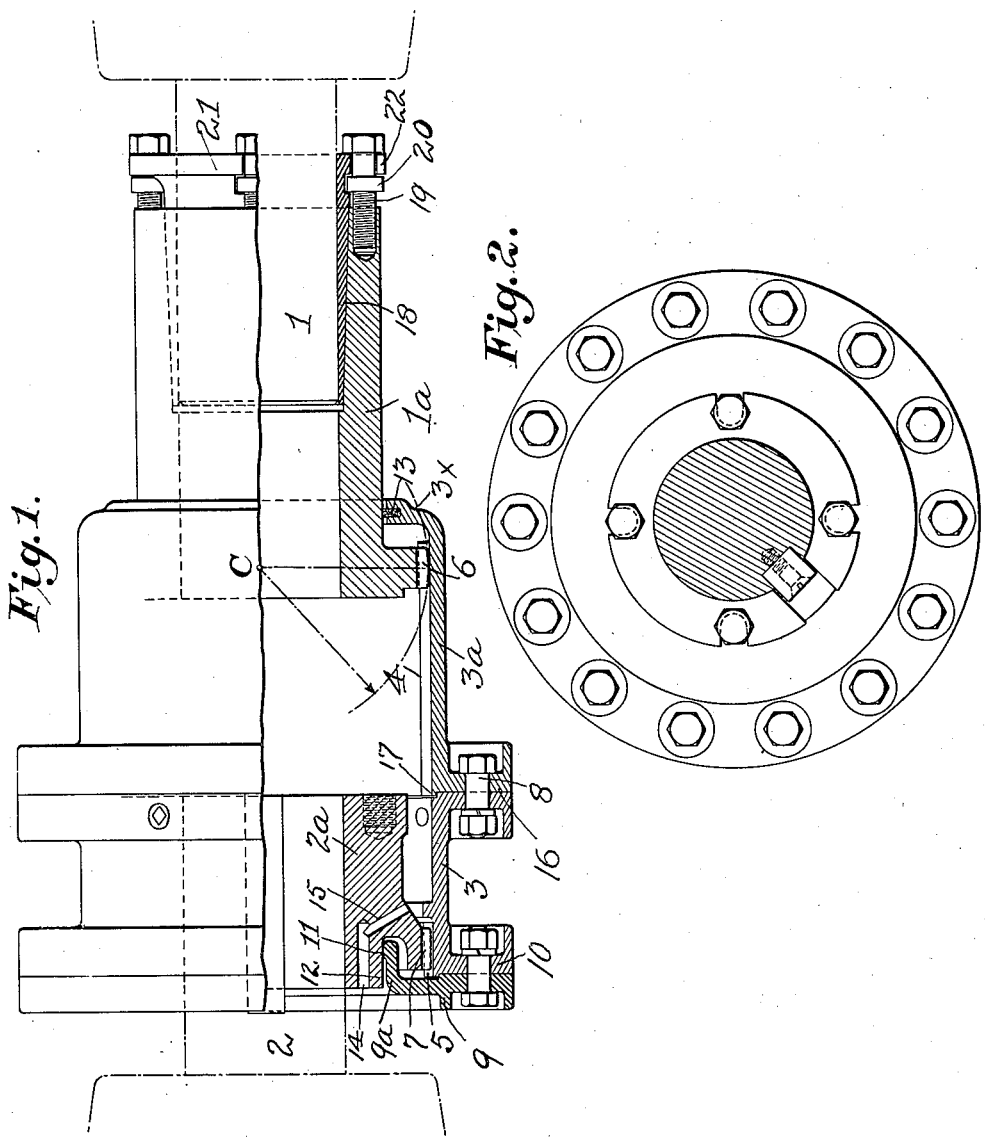
Inventor:
Gustave Fast,
by Spear, Middleton, Donaldson + Hall
Attys.

Patented Sept. 6, 1927.

1,641,668

UNITED STATES PATENT OFFICE.

GUSTAVE FAST, OF ANNAPOLIS, MARYLAND, ASSIGNOR TO THE BARTLETT HAYWARD COMPANY, OF BALTIMORE, MARYLAND, A CORPORATION OF MARYLAND.

FLEXIBLE SHAFT COUPLING FOR RELATIVELY-ADJUSTABLE SHAFTS.

Application filed March 17, 1925, Serial No. 16,188. Renewed April 16, 1927.

The invention relates to flexible shaft couplings of the general type disclosed in Letters Patent of the United States granted to me Oct. 26, 1920, No. 1,356,860, Reissue No. 15,177, of Aug. 16, 1921, the present improvement concerning more particularly a construction whereby the coupling, besides taking care of conditions arising from misaligned shafts, is adapted for use where it is necessary to make adjustments of one shaft in the direction of its axis relative to the other, such, for instance, as in connection with a Jordan engine for grinding paper pulp, in which it is necessary to adjust the driven conical grinding element relative to the surrounding stationary grinding member. Generally speaking, the coupling is of a telescoping character, in that it may be adjusted to connect the shaft ends set at different distances apart, but the invention is not limited to its use with any particular machine.

In the accompanying drawings:—

Figure 1 is a view of the coupling partly in side elevation and partly in longitudinal section.

Fig. 2 is an end view of the coupling.

In these drawings 1 indicates the end of the shaft, which is connected to and drives the rotary member of the engine, or other machine, and which member is to be capable of adjustment in an axial direction. 2 indicates the driving shaft connected with the motor.

The coupling between these two shafts comprises generally a hub 1ª adjustably attached, as hereinafter described, to the driven shaft 1, a hub 2ª keyed to the driving shaft 2, a sleeve composed of sections 3, 3ª, surrounding the shaft hubs, annular rows of internal teeth 4 and 5 on the sleeve, and annular rows of teeth 6 and 7 on the hubs 1ª and 2ª respectively, meshing with the internal teeth of the sleeve.

The sleeve is composed of sections bolted together at 8. The sleeve section 3ª into which the hub 1ª extends is longer than the other section, and its internal teeth 4 extend substantially from one end to the other thereof, so that the shaft hub 1ª may have a considerable range of adjustment axially in respect to this sleeve section, while maintaining engagement of the teeth 6 of the hub with the teeth of the sleeve.

In this connection also it will be noted that the hub 1ª extends beyond the shaft end to which it is attached and that the teeth 6 are located at the inner extremity of this extended hub and that there is provided a range of adjustment of the hub relative to the sleeve section 3ª about equal to the length of said section before the hub 1ª reaches as close as practicable to the other shaft 2 and its hub 2ª. In other words, the teeth 6 are located at the inner extremity of the hub 1ª or that extremity which lies closest to the center of the coupling organization. These teeth therefore can be termed terminal teeth, because they are located adjacent to or beyond the terminus of the shaft section 1, which is to be adjusted, and in this respect they are distinguished from the teeth 7 which instead of being located at or beyond the inner end of the motor shaft, are located towards the outer end of the coupling in respect to said terminal end.

The rocking bearing between the sleeve and the hub 2ª may be of substantially the form shown in the patent above noted, though I do not limit myself in this respect. In the form illustrated as an example, the rocking bearing consists of a ring 9 bolted to an outwardly extending flange 10 on the sleeve section, said plate or ring having a flange 9ª provided with an annular bearing face 11 which is rounded slightly to rock on the cylindrical surface 12 on the shaft hub.

This rocking bearing is located, like in the patented form, in a plane extending transversely of the sleeve and shaft axis and substantially midway of the length of the teeth 7.

The rocking bearing between the sleeve section 3ª and the shaft end or hub 1ª is provided by making the crowns of the teeth 6 conform to sections of a sphere whose center is at the axis of the hub and in a plane extending transversely of said axis and substantially midway of the length of the teeth 6.

The sleeve has an end wall 3ˣ with packing at 13 to retain lubricant, which may be introduced into the sleeve through the port 14 and its inclined extension 15. The level of oil, when the coupling is at rest, is sufficiently high to reach and lubricate the rocking bearing surface 11. The filling opening 14 is located at a point nearer the axis of the coupling than the rocking bearing to insure a proper depth of the lubricant. It is important to make the sleeve tight against the escape of lubricant. Under centrifugal action the lubricant is forced to the surfaces to be lubricated under considerable pressure, and it would pass out through the joints unless these are formed with a view to prevent this.

In the present construction the flanges of the sleeve are provided with broad bearing surfaces at 16 and with shoulders at 17 and the bolts draw these surfaces and shoulders into such close relation that no escape of lubricant can take place at these points.

A similar rugged construction is provided at the end of the coupling by bolting the end wall 9 to the flange 10. When the coupling is in operation the sleeve sometimes floats axially, due to axial shocks from the connected shafts and the flange and bolt connection is adapted to withstand the strain resulting from these shocks and the end plate will be held tight against the sleeve and an oil tight joint maintained.

The hub 1ª is attached to the driven shaft 1 of the Jordan engine or other machine, to be driven, by adjustable means which will permit setting the shaft end in different positions relative to the coupling. For this purpose a bronze collar 18 has a cylindrical bore to fit upon the shaft end and a tapered or frusto-conical exterior to fit a similarly shaped recess in the shaft hub. The hub has bolts 19 threaded into openings in its end and these bolts have flanges 20 between which and the heads of the bolts the flange 21 of the conical sleeve or collar 18 is embraced. This flange is notched at 22 to receive the bolts. By loosening these bolts the conical bronze sleeve may be retracted from its seat in the end of the hub 1ª and then the desired adjustment of the shaft end relative to the coupling, in an axial direction, can be effected, after which by tightening up on the bolts the conical bronze sleeve will secure the shaft end and hub together in their new relation. The sleeve 18 is driven by a key fastened to the shaft. A further adjustment of the shaft end relative to the coupling can be made by adjusting the said shaft with its affixed hub axially of the coupling. In this adjustment the teeth 6 of the shaft hub will occupy different positions along the internal teeth 4 of the sleeve section 3ª, according to the extent of the adjustment effected.

It will be understood that the sleeve section 3ª of the coupling which carries the teeth 4 can be made as long as desired to suit any desired range of adjustment, but as a rule the adjustment will be made by the two stages described above, i. e., one by shifting the shaft end relative to the shaft hub 1ª, and the other stage by shifting the shaft end with its attached hub relative to the coupling sleeve, and by this two stage adjustment the coupling can be made short in length and yet all requirements will be met, for either small or large amounts of adjustments. In all adjustments, the teeth 6 with their sections of the spherical bearing surface at their crowns, will be capable of performing the relative rocking movement above described in case of misalignment of the shaft ends.

Because the coupling is lubricated as above described, there is no tendency for the shaft end, when being adjusted, to jump ahead of the prescribed point, such as is the case with couplings running dry, and thus very fine axial adjustments can be made.

One set of teeth at each end of the coupling may have their contacting or side faces convexly curved from end to end and cooperate with the straight sides of their companion teeth, or in some cases both rows of the teeth which intermesh may have curved side faces.

I claim:

1. A flexible coupling for shafts, one of which is to be adjusted axially relative to the other, comprising a sleeve having a row of internal teeth at each end, a row of teeth connected with each shaft end, that row belonging to the shaft end which is to be adjusted, being at the inner extremity of said shaft, and the teeth of the sleeve with which said last mentioned teeth engage being longer than the teeth at the other end of the coupling to permit said axial adjustment of the said shaft while the engagement of the teeth is maintained, said sleeve having rocking movement, under misalignment of the shafts, and in all positions of adjustment, about points in planes transverse to and substantially midway of the intermeshing portions of the teeth, substantially as described.

2. A flexible coupling for shafts, one of which is to be adjusted axially relative to the other, comprising a sleeve having a row of internal teeth at each end, a row of teeth in substantially terminal relation to the shaft end which is to be adjusted, a row of teeth for the other shaft end located at a point back from the end of said shaft end, the internal teeth of the sleeve with which the terminal teeth engage being longer than the internal teeth at the other end of the sleeve, to maintain engagement with the terminal teeth in all positions to which the latter may be shifted, said sleeve having rocking movement relative to the shaft ends, under misalignment, and in all positions of adjustment about points in planes transverse to and substantially midway of the teeth of the shaft ends.

3. A flexible telescopic coupling for shafts, one of which is to be adjusted axially relative to the other, comprising a sleeve having an internal row of teeth at one end, a row of internal teeth at the other end longer than those of the row first mentioned, a row of teeth connected with each shaft end meshing respectively with the sleeve teeth, that row of teeth on the shaft end which meshes with and is to be adjusted relative to the long teeth being substantially in terminal relation to said shaft and having their top surfaces curved to conform to sections of a sphere, to form with the wall of the sleeve a rocking bearing for one end of the coupling, said sleeve having a rocking bearing at its other end in a plane transverse to and intermediate the length of the teeth, substantially as described.

4. A flexible coupling for shafts which are to be adjusted axially relative to each other, comprising a sleeve formed in sections, one of which is longer axially than the other, means for securing said sections together, a row of internal teeth in the short section, a row of longer internal teeth on the longer section, a hub for each shaft, each having an annular row of teeth to engage the internal teeth of the sleeve, that row which meshes with the elongated teeth being at the inner extremity of the hub which carries them, said sleeve having rocking movement relative to the shaft hubs in all positions of adjustment, substantially as described.

5. A flexible coupling for shafts, comprising a sleeve having a set of internal teeth at each end, one set being elongated, shaft hubs, one for each shaft end, having teeth to engage the internal teeth of the sleeve, one of said shaft hubs having its teeth in substantially terminal relation to its inner end to occupy different positions along the elongated teeth, and an adjustable connection between the latter shaft hub and its shaft end whereby said hub may be set in different positions along said shaft end, said sleeve having rocking bearing movement about points in planes transverse to and intermediate of the length of the shaft hub teeth under all adjustments of the coupling, substantially as described.

6. In combination in a flexible shaft coupling, a sleeve having internal elongated teeth, a shaft hub having teeth at its inner end engaging the internal teeth, said sleeve and hub being adjustable axially relative to each other, in which adjustment the hub teeth maintain their engagement with the elongated teeth of the sleeve, an adjustable connection between the shaft hub and the shaft end comprising a sleeve having a cylindrical bore to receive the shaft end and a tapered exterior to fit a corresponding recess in the outer end of the shaft hub, and bolts connecting the shaft hub and conical sleeve and serving to force the said conical sleeve into the recess of the shaft hub, said coupling having a rocking bearing between the sleeve and the shaft hub located in a plane transverse to and intermediate the length of the teeth of the shaft hub, substantially as described.

7. A flexible shaft coupling comprising a sleeve having internal teeth at its opposite ends, a shaft hub with means for affixing it to the shaft end in different positions along the same, said shaft hub having teeth engaging the internal teeth of the sleeve, the latter teeth being elongated to mesh with the teeth of the hub in all the positions to which the latter may be adjusted, said coupling having a rocking movement about points located in a plane transverse to and intermediate the length of the hub teeth, substantially as described.

8. A shaft coupling comprising a sleeve between the shaft ends, hubs on the shaft ends, annular rows of intermeshing teeth connecting the sleeve and hubs, and permitting relative shifting movement axially between sleeve and a shaft hub, and means for adjustably holding one hub to its shaft end to permit setting of the hub in different positions along the shaft end, substantially as described.

9. A flexible shaft coupling comprising a shaft hub for each shaft having each a row of external teeth, a sleeve surrounding the shaft ends and having at each end an internal row of teeth engaging the teeth of the shaft hubs, the teeth of the sleeve at one end thereof being elongated to permit adustment of one of the shafts with its shaft hub and teeth axially, a rocking bearing between the adjustable shaft hub and the sleeve consisting of the rounded crowns of the teeth of said hub engaging the sleeve wall, and a rocking bearing between the other end of the sleeve and the other shaft hub arranged in a plane transverse to and intermediate the length of the teeth, substantially as described.

In testimony whereof, I affix my signature.

GUSTAVE FAST.